May 24, 1966 H. E. ERIKSON 3,253,145
APPARATUS FOR EXPOSING AND DEVELOPING PHOTOSENSITIVE ELEMENTS
Filed Aug. 1, 1962 3 Sheets-Sheet 1

Herman E. Erikson
INVENTOR.

BY Brown and Mikulka
and
Alvin Isaacs
ATTORNEYS

May 24, 1966   H. E. ERIKSON   3,253,145
APPARATUS FOR EXPOSING AND DEVELOPING PHOTOSENSITIVE ELEMENTS
Filed Aug. 1, 1962   3 Sheets-Sheet 2

Herman E. Erikson
INVENTOR.
BY Brown and Mikulka
and
Alvin Isaacs
ATTORNEYS

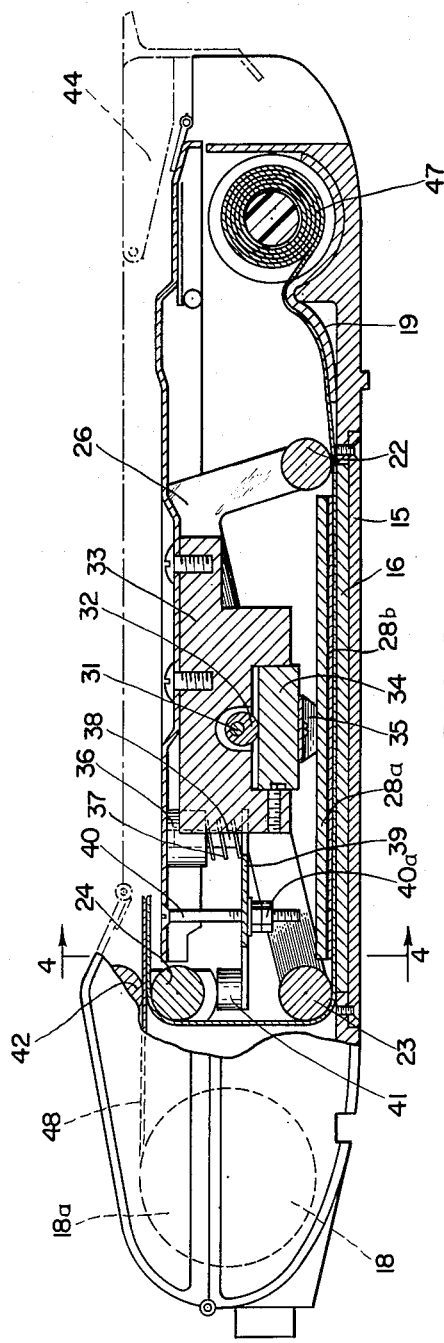
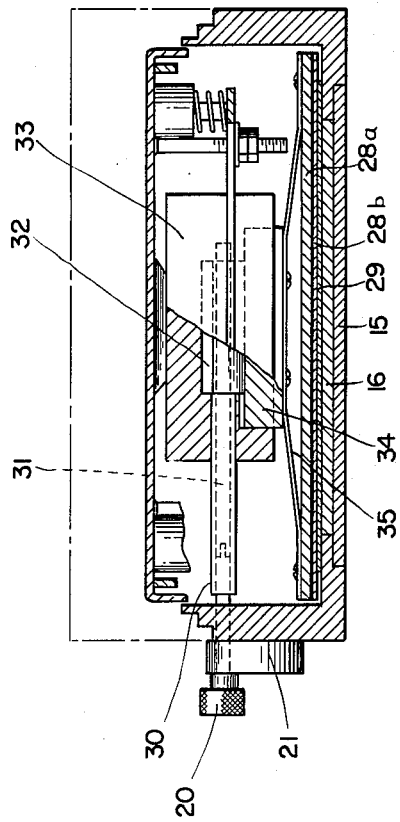

United States Patent Office 3,253,145
Patented May 24, 1966

3,253,145
APPARATUS FOR EXPOSING AND DEVELOPING PHOTOSENSITIVE ELEMENTS
Herman E. Erikson, Winchester, Mass., assignor to Polaroid Corporation, Cambridge, Mass., a corporation of Delaware
Filed Aug. 1, 1962, Ser. No. 214,062
4 Claims. (Cl. 250—65)

This application relates to photography and, more particularly, to a novel device for exposing and developing a photosensitive element.

A primary object of this invention is to provide a novel device for exposing and developing a photosensitive element.

Another object is to provide a novel device for exposing and developing a photosensitive element, having exposing means and a forward focal plane whereby the photosensitive element is brought in close relationship to the exposing means during exposure.

Still another object of the invention is to provide a novel X-ray cassette.

Yet another object is to provide a novel X-ray cassette in which development to form a visible record may be effected without removal of the exposed light-sensitive element therefrom.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a side view in cross-section; and

FIG. 4 is a sectional view taken along lines 4—4 of FIG. 3.

X-ray cassettes are of course well known in the field of radiography. Generally, such cassettes comprise a film holder which is opaque to actinic light but which is transparent to radiation emanating from a radioactive or fissionable material, such as gamma-rays, neutron rays, etc., or from a source which produces penetrating radiation commonly referred to as X-rays.

One embodiment of the present invention provides a cassette of the foregoing nature in which exposure and processing may both be accomplished to provide, in a manner of seconds, a visible image by well-known diffusion transfer processes.

The invention may be more clearly understood by reference to the accompanying drawings which show by way of illustration, and not by way of limitation, the novel apparatus of this invention.

Figure 1:
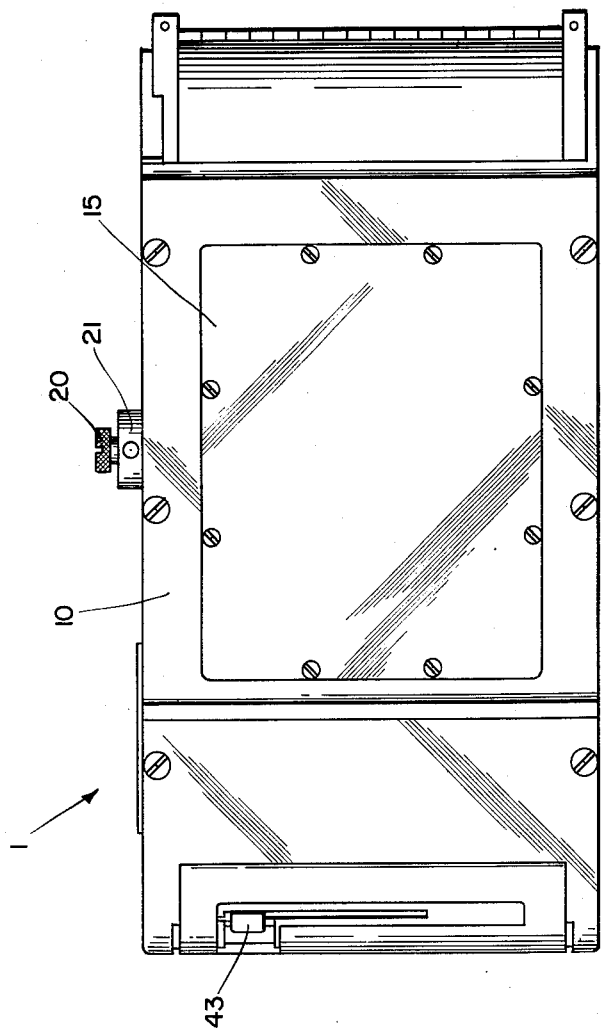
FIGURE 1 is a front elevation of the novel apparatus of this invention.
Figure 2:
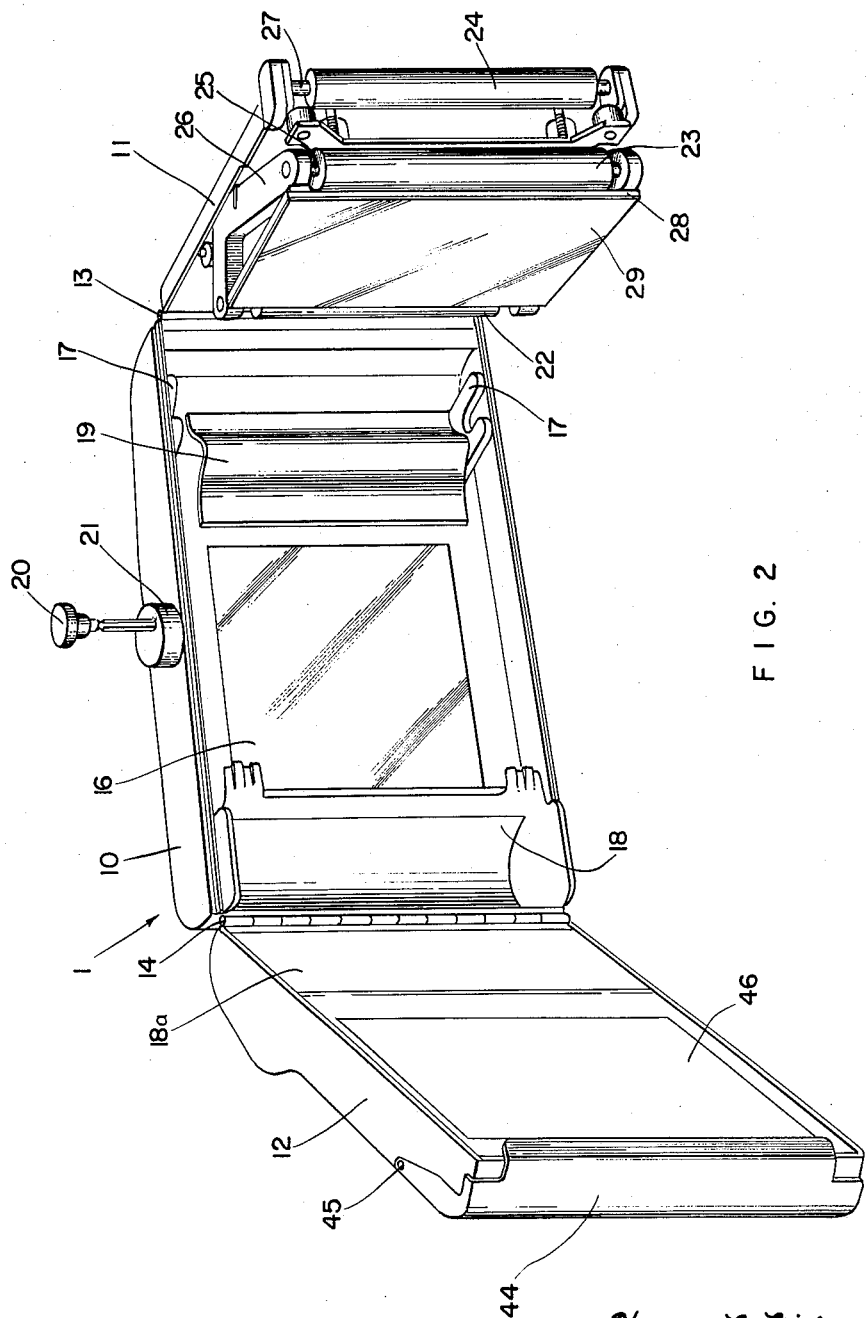
FIG. 2 is a perspective view taken from the rear and showing the apparatus open for loading or unloading.

With particular reference to FIGS. 1 and 2, the novel apparatus of this invention is shown to comprise a light-tight container 1 having a housing 10, an inner bridge member 11 and an outer cover 12. Bridge member 11 and outer cover 12 are hinged or pivoted at 13 and 14 respectively to permit access to the interior of container 1. Housing 10 and outer cover 12 are made of a suitable material, preferably metal, which is opaque to actinic light and which also resists transmission of radioactive radiation at least at the dosages customarily employed in radiography.

Housing 10 is provided with an opening or orifice of substantially the size and dimensions of the film employed. Over this opening, radiation transmitting means 15 is mounted. Transmitting means 15 is preferably removably mounted so that container 1 may be employed with different types of radiation. If X-rays are employed, transmitting means 15 may, for example, be made of "Bakelite" (trade name for a thermosetting phenolic plastic manufactured by the Bakelite Co.) or other suitable materials opaque to actinic light but transparent to X-rays. If neutrons are employed, transmitting means 15 may, for example, be made of aluminum, or other suitable materials opaque to actinic light but transparent to neutrons.

Interior of transmitting means 15 and preferably contiguous therewith, an intensifier screen 16 is provided. Screen 16 is at least of the same size as transmitting means 15 so that all radiation passing through transmitting means 15 strikes or is transmitted to screen 16. Screen 16 may comprise any of the intensifier screens heretofore known in the art. As is well known in radiography, the purpose of such screens is to intensify the exposure from a given dosage of radiation, thereby permitting satisfactory visible images to be obtained with appreciably less dosage. Such screens may contain phosphors which emit visible or ultraviolet light when excited by a suitable source of radiation and this visible or ultraviolet light in turn is employed to expose a photosensitive material positioned within container 1, as will be described in more detail hereinafter. As an example of such screens, mention may be made of "Du Pont CB2," trade name of a zinic cadmium sulfide intensifier screen sold by E. I. du Pont de Nemours Co.

Housing 10 is provided with a pair of brackets 17 on which a strip of negative film, e.g., a photosensitive element, is trunnioned. Housing 10 also has a semi-cylindrical cavity 18 which co-operates with a like cavity 18a in the outer cover to provide a cylindrical cavity where a roll or strip containing the so-called positive or image-receiving material is rotatably mounted. A lead shield or the like 19 is also preferably but not necessarily positioned near the negative film to prevent premature or unintentional exposure of the photosensitive material trunnioned on brackets 17.

A key 20 is mounted on a collar 21. The purpose of key 20 is to provide suitable tension or pressure during exposure, as will be discussed in more detail hereinafter.

As shown in FIG. 2, inner bridge member 11 is provided with a pair of guide rollers 22 and 23 and a roller or pressure member 24. Rollers 22 and 23 are mounted on a pair of shafts 25 positioned on a pair of V-shaped brackets 26. Shafts 25 are suitably journaled for rotation at their extremities. In like manner, pressure roller 24 is also mounted on a shaft 27 suitably journaled for rotation at its extremities. As will be described hereinafter, shaft 27 containing roller 24 is slightly movable to effect a variance in the pressure exerted by roller 24 upon the film assembly passing thereover.

A movable pressure plate 28 is mounted on a leaf spring 35 (as shown in FIGS. 3 and 4). Plate 28 is preferably but not necessarily a laminated structure comprising an inner layer 28a of aluminum or the like and an outer layer 28b of a material resistant to transmission of radiation, such as lead. As shown in FIGS. 2 and 4, an intensifier screen 29 is preferably mounted on plate 28. Screen 29 may be the same or different from screen 16.

With particular reference to FIGS. 3 and 4, the function of key 20 will now be described. Key 20 is inserted into sleeve 30 where it engages cam shaft 31 to cause movement of cam 32. Sleeve 30 is fixed in a rigid support 33. It will therefore be apparent that a 90° twist or turn of key 20 will cause movement of block-shaped cam follower 34 upon which movable pressure plate 28 is mounted. Thus, movement of key 20 in one position will permit the maximum amount of pressure to be exerted by pressure plate 28, while a 90° turn will create the minimum amount of pressure. The purpose of having a variation in pressure will be more apparent hereinafter in the description of the operation of the novel apparatus of this invention.

As was mentioned heretofore, pressure roller 24 is also movable to effect a variance in the pressure it exerts during processing of the exposed film. As shown in FIG. 3, rigid support means 36 is mounted on the base of inner bridge member 11. Means 36 exerts a downward pressure upon a partially compressed helical spring 37 around shaft 38 which is joined at one end to means 36 and at the other end to a tension rocker or lever 39. Lever 39 is mounted at the center thereof on bolt 40 and rests on nut 40a. At the other end thereof, a pressure-exerting or contacting means 41 is provided. Means 41 exerts an upward pressure on roller 24, due to the downward thrust exerted by spring 37 upon lever 39. This permits roller 24 co-operating with roller 42 (rotatably mounted on outer cover 12 in the same manner as rollers 22 and 23) to exert the necessary pressure on the film unit passing therebetween during processing.

Referring back to FIGS. 1 and 2, latch or locking means 43 is provided to permit access to the interior of container 1 and to ensure a lighttight seal when the container is loaded. Outer cover 12 also has a cutter bar 44 hinged at 45 which in the closed position covers a film discharge opening (not shown) to complete the lighttight seal but which when pivoted to the open position provides means at its free end for severing the film strip passing therethrough. Locking means and cutter bars of the foregoing nature are old in the art and are, for example, provided on self-developing cameras of the general description of that described in U.S. Patent No. 2,455,111.

As is also well known and described in the aforementioned patent, outer cover 12 also contains a window or door 46 hinged at one side thereof and provided with suitable light seals and latches, to permit access to the developed print therebeneath.

In operation, the novel apparatus of this invention utilizes principles of photography and/or radiography known in the art to obtain a transfer print in a manner of seconds. A film unit such as those sold by the Polaroid Corporation for use in self-developing cameras is employed. As is well known, such film units comprise a roll of negative film, e.g., film containing a photosensitive material, preferably silver halide, a roll of sheet material containing an image-receiving layer, and a plurality of frangible containers of an aqueous processing solution positioned at predetermined spaced intervals along the roll of sheet material. Film assemblies of the foregoing nature are described with more particularity, for example, in U.S. Patent No. 2,543,181.

The apparatus is loaded by opening container 1 in the manner illustrated in FIG. 2. A roll of negative film 47 containing the photosensitive material is trunnioned on brackets 17 and the roll of positive sheet material 48 containing the image-receiving layer is placed in the semi-cylindrical cavity 18. As both roll 47 and roll 48 have a common leader, they are advanced into superposed relationship by passing the end or leader through pressure rollers 24 and 42 and out of the discharge opening defined by cutter bar 44. Guide rollers 22 and 23, as will be apparent from the drawings, are so positioned as to confine the negative material in close proximity to intensifier screen 16. This is an essential feature of the present invention in order to prevent distortion of the visible image produced by actinic light emanating from screen 16.

In use, key 20 is turned so as to obtain the maximum pressure exerted by movable pressure plate 28. As will be apparent, the purpose of pressure plate 28 is to hold the portion of the negative to be exposed tightly against screen 16, thereby minimizing any distortion and enabling the roentgenologist or other viewer to obtain a clear, sharp radiograph.

Container 1 is then positioned with radiation transmitting means 15 against the subject matter and radiation from a suitable source, e.g., X-rays, are transmitted through the subject matter and means 15, thereby striking or bombarding intensifier screen 16 which in turn emits visible light to expose the portion of the negative roll confined tightly therebeneath. Shield 19 protects the negative on the roll from fogging due to premature and unintentional exposure. While screen 29 is not essential with paper base negatives, it is preferred with film base negatives, since it co-operates with screen 16 in exposing the negative.

Subsequent to exposure, the pressure created by pressure plate 28 is lessened by turning key 20, thereby permitting the exposed negative to be advanced to the processing portion of the camera. This is accomplished by lifting cutter bar 44 and pulling on the free end of the film assembly which is outside of the discharge opening.

The exposed negative is brought into superposed relationship with the image-receiving layer, with the frangible container having the requisite amount of processing solution positioned therebetween. As the superposed film structure is passed through pressure rollers 24 and 42, the frangible container is ruptured, thereby spreading the processing or developing solution in a uniform layer between the exposed negative and the superposed image-receiving layer. In a well-known manner, the exposed silver halide is reduced and the unexposed silver halide is transferred, by imbibition, to the superposed image-receiving layer to form a positive image thereon.

After the appropriate processing time, door 46 is opened to reveal the transfer image, which may be separated from the superposed negative film.

From the foregoing description and illustrative drawings, it will be apparent that a simple and efficient cassette is provided in which both exposure and processing may be performed to obtain a clear, sharp radiograph in a manner of seconds.

In a second embodiment of the invention, transmitting means 15 and screen 16 are removed to provide a device which is useful in standard photographic systems. For example, it has previously been suggested that camera bodies of the character described in the aforementioned U.S. Patent No. 2,455,111 may be employed with conventional view cameras. Due to the rear focal plane of such camera bodies, it has heretofore been necessary to refocus and/or to use various accessories to compensate for the positioning of the film in the rear portion of the camera body.

The forward focal plane obtained by the present invention, wherein the negative film is positioned prior to exposure contiguous with the opening in the housing, obviates the aforementioned difficulties.

The second embodiment of the invention has been found to be particularly useful in photofluorographic work, merely by mounting a suitable lens over the opening in the housing. The forward focal plane of the housing provides a simple and efficient device for obtaining photofluorographs in a matter of seconds.

It will be apparent that various changes may be made without departing from the scope of the invention. It will likewise be appreciated by those skilled in the art that certain of the elements described for purposes of illustration are not essential to the practice of the invention and may be eliminated.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic device including means for confining a photosensitive sheet; means defining an exposure station for exposing said photosensitive sheet when advanced therein from said confining means; means defining a development station for developing said sheet after photoexposure thereof; and means for advancing said sheet from said exposure station to said development station, said photographic device further including a front housing means defining an opening therein for photoexposing said sheet when positioned therebeneath in said exposure station; the improvement which comprises means for advancing said sheet from said confining means to said exposure station, said advancing means comprising means associated with said confining means for advancing said sheet rearwardly with respect to said front housing and means for changing said direction of advancement frontwardly into said exposure station and in juxtaposition with said opening in said front housing.

2. A device as defined in claim 1 including a sheet means covering said opening, said sheet means being transparent to invisible radiation but opaque to visible light; and means for emitting visible light when excited by invisible radiation transmitted through said sheet means, said light-emitting means being contiguous and at least coextensive with the inner surface of said sheet means.

3. A device as defined in claim 1 including a movable pressure plate adapted for releasably confining said photosensitive sheet; and means for effecting movement of said pressure plate relative to said sheet, said means for effecting movement comprising a key movably mounted on said housing and cooperating with a cam shaft associated with said pressure plate.

4. A device as defined in claim 3 including a second light-emitting means mounted on said pressure plate.

References Cited by the Examiner

UNITED STATES PATENTS

| | | | |
|---|---|---|---|
| 2,026,000 | 12/1935 | Powers | 250—68 X |
| 2,707,237 | 4/1955 | Shurcliff | 250—83 |
| 2,708,864 | 5/1955 | Land | 250—65 X |
| 2,769,095 | 10/1956 | Forrer et al. | 250—68 |
| 2,812,441 | 11/1957 | Kamiss | 250—68 |

RALPH G. NILSON, *Primary Examiner.*

HENRY S. MILLER, GUY E. MATTHEWS, ARCHIE R. BORCHELT, *Assistant Examiners.*